(12) United States Patent
Tsuchida

(10) Patent No.: US 10,261,526 B2
(45) Date of Patent: Apr. 16, 2019

(54) PRESSURE REDUCING VALVE

(71) Applicant: KOSMEK LTD., Hyogo (JP)

(72) Inventor: Takeshi Tsuchida, Hyogo (JP)

(73) Assignee: KOSMEK LTD., Kobe-shi, Hyogo (JP)

( * ) Notice: Subject to any disclaimer, the term of this patent is extended or adjusted under 35 U.S.C. 154(b) by 107 days.

(21) Appl. No.: 15/127,631

(22) PCT Filed: Apr. 1, 2015

(86) PCT No.: PCT/JP2015/060369
§ 371 (c)(1),
(2) Date: Sep. 20, 2016

(87) PCT Pub. No.: WO2015/152338
PCT Pub. Date: Oct. 8, 2015

(65) Prior Publication Data
US 2017/0147014 A1 May 25, 2017

(30) Foreign Application Priority Data

Apr. 4, 2014 (JP) ................................. 2014-088574

(51) Int. Cl.
*F16K 15/02* (2006.01)
*F16K 17/04* (2006.01)
(Continued)

(52) U.S. Cl.
CPC ........... *G05D 16/02* (2013.01); *F16K 15/026* (2013.01); *F16K 17/0433* (2013.01);
(Continued)

(58) Field of Classification Search
CPC ....... Y10T 137/7794; Y10T 137/87555; Y10T 137/87394; G05D 16/02; G05D 16/10;
(Continued)

(56) References Cited

U.S. PATENT DOCUMENTS 2,655,936 A * 10/1953 Wexler ................. G05D 16/103
137/543.17
2,664,672 A * 1/1954 Ey ....................... G05D 16/0688
137/248
(Continued)

FOREIGN PATENT DOCUMENTS

CN        2 320858 Y     5/1999
CN    10 1080593 A   11/2007
(Continued)

OTHER PUBLICATIONS

International Preliminary Report on Patentability (IPRP) including the Written Opinion in the corresponding International application No. PCT/JP2015/060369 dated Oct. 4, 2016.
(Continued)

*Primary Examiner* — Jessica Cahill
(74) *Attorney, Agent, or Firm* — Bacon & Thomas, PLLC

(57) ABSTRACT

There is provided a pressure reducing valve in which phenomena of vibration occurring with respect to a pressure reducing member and/or a pressure receiving piston are reliably dampened. When a pressure receiving piston (19) is advanced rightward to increase the volume of a fluid chamber (28) defined by the pressure receiving piston (19) and a piston hole (18), the pressure in the fluid chamber (28) drops to close a check valve (34), and the pressurized fluid in an outlet chamber (10) flows into the fluid chamber (28) through a throttle portion (31). When the pressure receiving piston (19) is retracted leftward to reduce the volume of the fluid chamber (28), the pressure in the fluid chamber (28) rises to open the check valve (34), and the pressurized fluid in the fluid chamber (28) flows out to the outlet chamber (10).

6 Claims, 4 Drawing Sheets

(51) Int. Cl.
*F16K 17/30* (2006.01)
*F16K 47/02* (2006.01)
*G05D 16/02* (2006.01)
*G05D 16/10* (2006.01)

(52) U.S. Cl.
CPC .............. *F16K 17/30* (2013.01); *F16K 47/02* (2013.01); *G05D 16/10* (2013.01)

(58) Field of Classification Search
CPC .... F16K 15/026; F16K 17/0433; F16K 17/03; F16K 47/02
See application file for complete search history.

(56) References Cited

U.S. PATENT DOCUMENTS

| | | | | |
|---|---|---|---|---|
| 3,206,158 A | * | 9/1965 | Bloomquist | F16K 17/10 251/25 |
| 3,744,526 A | * | 7/1973 | MacNiel | B63C 11/2209 128/205.24 |
| 4,171,004 A | * | 10/1979 | Cerrato | G05D 16/0663 137/115.14 |
| 4,194,522 A | * | 3/1980 | Lucas | G05D 16/103 137/116.5 |
| 5,027,847 A | * | 7/1991 | Snyder | G05D 16/10 137/119.09 |
| 5,979,862 A | * | 11/1999 | Wolfges | F16K 17/0433 137/596.16 |
| 2012/0325331 A1 | * | 12/2012 | Mangiagli | G05D 16/10 137/12 |

FOREIGN PATENT DOCUMENTS

| | | |
|---|---|---|
| JP | S4861297 U | 8/1973 |
| JP | S527024 A | 1/1977 |
| JP | 57-156670 U | 10/1982 |
| JP | S57156670 U | 10/1982 |
| JP | H2-38609 U | 3/1990 |
| JP | H0238609 U | 3/1990 |
| JP | 2001-51727 A | 2/2001 |
| JP | 2001051727 A | 2/2001 |
| JP | 3617841 B2 | 2/2005 |
| WO | 98 / 30859 A1 | 7/1998 |

OTHER PUBLICATIONS

English language translation of the International Preliminary Report on Patentability (IPRP) including the Written Opinion in the corresponding International application No. PCT/JP2015/060369 dated Oct. 4, 2016.
International Search Report dated Jun. 30, 2015 for PCT/JP2015/060369.
Extended European Search Report in corresponding European Patent Appln. No. 15774417.8 dated Oct. 13, 2017.
Office Action dated Jan. 31, 2018 issued in corresponding Japanese application No. 2014-088574.
Office Action dated Jul. 23, 2018 issued in corresponding Chinese application No. 2015-80011244.2.

* cited by examiner

PRESSURE REDUCING VALVE

TECHNICAL FIELD

The present invention relates to a pressure reducing valve. In particular, the present invention relates to a technique of suppressing phenomena of vibration such as hunting and chattering which may occur with respect to a pressure receiving piston and a pressure reducing member inserted into a valve case.

BACKGROUND ART

As a pressure reducing valve of this type, there has been known a valve described in Patent Literature 1 (Japanese Unexamined Patent Publication No. 051727/2001 (Tokukai 2001-051727)). The known valve is structured as follows.

A pressure receiving piston is inserted into an outlet chamber in a valve case. A pressure reducing member is inserted into an inlet chamber in the valve case, and a needle valve member is inserted into an accommodation hole formed in the pressure reducing member. When the pressure in the outlet chamber rises to bring the pressure reducing member into the close state, the pressurized fluid in the inlet chamber flows out to the outlet chamber through a throttle passage formed on an outer periphery of the needle valve member. When the pressure in the outlet chamber further rises to reach a setting value, the needle valve member is brought into the closed state.

CITATION LIST

Patent Literature

Patent Literature 1: Japanese Unexamined Patent Publication No. 051727/2001 (Tokukuai 2001-051727)

SUMMARY OF INVENTION

Technical Problem

In the known pressure reducing valve, a rapid variation in the pressure in the outlet chamber may cause a phenomenon of vibration such as hunting and chattering, and thereby the needle valve member, the pressure reducing member, and/or the pressure receiving piston may produce abnormal noise.

An object of the present invention is to provide a pressure reducing valve in which phenomena of vibration occurring with respect to a pressure reducing member and/or a pressure receiving piston are reliably suppressed.

Solution to Problem

In order to achieve the above object, the present invention structures a pressure reducing valve as follows, for example, as illustrated in FIG. 1, FIG. 2A to the FIG. 2C, FIG. 3, and FIG. 4.

An inlet chamber 8, a pressure reducing valve seat 9, and an outlet chamber 10 are formed in a valve case 1 so as to be arranged in a tandem manner from one end side to another end side. A pressure reducing member 14 is inserted into the inlet chamber 8 so as to be advanceable and retractable, and the pressure reducing member 14 is biased by a valve-closing spring 15 toward the other end side. A piston hole 18 is formed in the outlet chamber 10. A pressure receiving piston 19 is inserted into the piston hole 18 so as to be advanceable and retractable, and the pressure receiving piston 19 is biased by a pressure setting spring 44 toward the one end side. A fluid chamber 28 is defined by the piston hole 18 and the pressure receiving piston 19, and the volume of the fluid chamber 28 increases with advance of the pressure receiving piston 19 toward the one end side and decreases with retraction of the pressure receiving piston 19 toward the other end side. A first passage 29 and a second passage 30 are provided in parallel, each of which is provided to communicatively connect the fluid chamber 28 and the outlet chamber 10 with each other. A check valve 34 provided in the first passage 29 is configured to prevent flow from the outlet chamber 10 to the fluid chamber 28 and to permit flow from the fluid chamber 28 to the outlet chamber 10. A throttle portion 31 is provided in the second passage 30.

Accordingly, the present invention brings about the following functions and effects.

When the pressure receiving piston is advanced toward the one end side to increase the volume of the fluid chamber, the pressure in the fluid chamber drops to close the check valve, and the pressurized fluid in the outlet chamber slowly flows into the fluid chamber through the throttle portion in the second passage. When the pressure receiving piston is retracted toward the other end side to reduce the volume of the fluid chamber, the pressure in the fluid chamber rises to open the check valve, and the pressurized fluid in the fluid chamber flows out to the outlet chamber through the first passage.

When the volume of the fluid chamber is increased as described above, the pressure in the fluid chamber becomes lower than the pressure in the outlet chamber, and a force due to the pressure differential between the pressure in the outlet chamber and the pressure in the fluid chamber is applied to the pressure receiving piston toward the other end side. Thus, the force due to the pressure differential acting toward the other end side functions as the resistance against the spring biasing the pressure receiving piston to advance toward the one end side, and this reduces the speed at which the pressure receiving piston is advanced toward the one end side.

Meanwhile, in the known pressure reducing valve, if the pressure in an outlet chamber which has been adjusted to a setting value rapidly drops, a phenomenon of vibration such as hunting and chattering may occur with respect to the pressure reducing member and/or the pressure receiving piston. In the present invention, however, the above-described resistance reduces the speed at which the pressure receiving piston is advanced toward the one end side, and this prevents a rapid rise of the pressure in the outlet chamber due to rapid opening of the pressure reducing member. As a result, vibration of the pressure receiving piston and the pressure reducing member is suppressed.

It is preferable to incorporate the following features (1) to (4) into the present invention.

(1) As illustrated in FIG. 1, FIG. 2A to FIG. 2C, and FIG. 3, for example, the throttle portion 31 is provided between the piston hole 18 and the pressure receiving piston 19.

In this arrangement, the pressure reducing valve has a mechanically simple structure.

(2) As illustrated in FIG. 1, FIG. 2A to FIG. 2C, and FIG. 3, the piston hole 18 includes a larger diameter hole 21 and a smaller diameter hole 20 which are formed in an end wall of the outlet chamber 10 on the other end side so as to be arranged in order toward the other end side. The pressure receiving piston 19 includes a smaller diameter portion 22 hermetically inserted into the smaller diameter hole 20 and a larger diameter portion 23 fitted in the larger diameter hole 21. The fluid chamber 28 is formed between the larger diameter hole 21 and the smaller diameter portion 22. The throttle portion 31 is provided between the larger diameter hole 21 and the larger diameter portion 23.

In this arrangement, the pressure reducing valve has a mechanically simple structure.

(3) As illustrated in FIG. 1 and FIG. 2A to FIG. 2C, for example, the check valve 34 is provided in the pressure receiving piston 19.

In this arrangement, a valve chamber and a valve seat of the check valve are easily machined, as compared with the case where the check valve is provided in the valve case, and therefore the pressure reducing valve is produced efficiently.

(4) As illustrated in FIG. 4, for example, the first passage 29 is formed between the piston hole 18 and an outer peripheral surface of the pressure receiving piston 19. The second passage 30 is provided in the pressure receiving piston 19 or in the valve case 1. The check valve 34 includes an elastic sealing member 50 attached between the piston hole 18 and the pressure receiving piston 19. The elastic sealing member 50 is configured to prevent the flow from the outlet chamber 10 to the fluid chamber 28 and to permit the flow from the fluid chamber 28 to the outlet chamber 10.

In this arrangement, the check valve has a mechanically simple structure.

BRIEF DESCRIPTION OF THE DRAWINGS

FIG. 2A shows the fully open state of the pressure reducing valve, FIG. 2B shows the mid-course state of switching from the fully open state to the closed state, and FIG. 2C shows the closed state of the pressure reducing valve.

DESCRIPTION OF EMBODIMENTS

Figure 1:
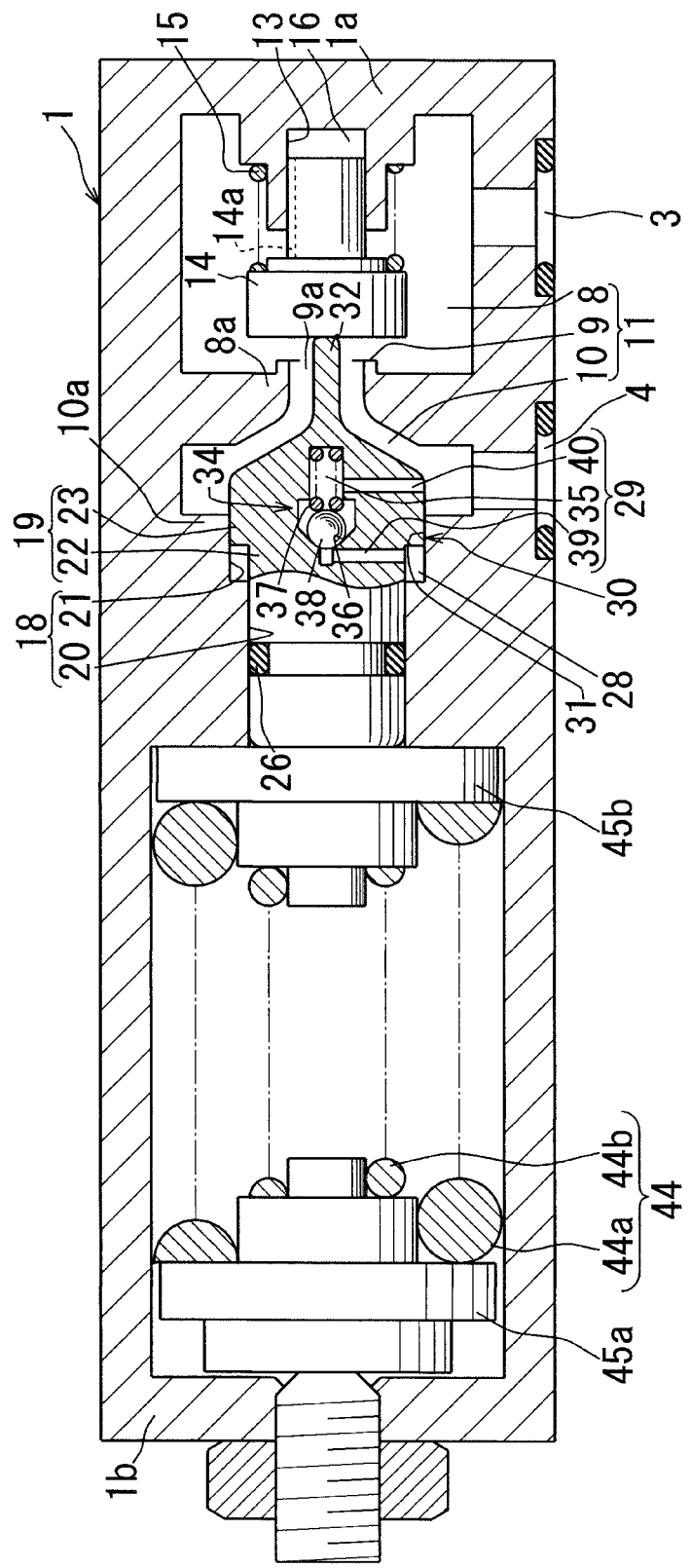
FIG. 1 shows First Embodiment of the present invention, and is a schematic cross section of a pressure reducing valve.

With reference to FIG. 1 and FIG. 2A to FIG. 2C, First Embodiment of the present invention will be described. First, the structure of a pressure reducing valve is described with reference to FIG. 1 illustrating the fully open state of the valve.

An inlet hole 3 and an outlet hole 4 for pressurized oil are provided at a lower portion of a valve case 1. The inlet hole 3 is communicatively connected to a hydraulic source, while the outlet hole 4 is communicatively connected to a hydraulic cylinder (both of them are not illustrated). In the valve case 1, an inlet chamber 8, a pressure reducing valve seat 9, and an outlet chamber 10 are formed to be arranged in a tandem manner from a right end wall 1a side (one end side) to a left end wall 1b side (the other end side). The inlet hole 3 is communicatively connected to the outlet hole 4 through a channel 11 formed so as to pass through the inlet chamber 8, the pressure reducing valve seat 9, and the outlet chamber 10.

In the right end wall 1a, an accommodation hole 13 is formed, and a pressure reducing member 14 is inserted into the accommodation hole 13 so as to be movable in a left-right direction. A valve-closing spring 15 attached between the right end wall 1a and the pressure reducing member 14 biases the pressure reducing member 14 leftward. A right end portion of the pressure reducing member 14 and a hole chamber 16 in the accommodation hole 13 are communicatively connected to the inlet chamber 8 by a groove 14a formed on a peripheral wall of the pressure reducing member 14. The pressure reducing valve seat 9 is formed on a left end wall 8a of the inlet chamber 8, and an opening 9a is formed at the center of the pressure reducing valve seat 9. Through the opening 9a, the inlet chamber 8 and the outlet chamber 10 are communicatively connected to each other.

A piston hole 18 formed in the outlet chamber 10 includes a larger diameter hole 21 and a smaller diameter hole 20 which are formed to be arranged in this order leftward from a left end wall 10a of the outlet chamber 10. Into the piston hole 18, a pressure receiving piston 19 is inserted so as to be movable in the left-right direction. The pressure receiving piston 19 includes: a smaller diameter portion 22 hermetically inserted into the smaller diameter hole 20 via a sealing member 26; and a larger diameter portion 23 fitted in the larger diameter hole 21. Between the larger diameter hole 21 and the smaller diameter portion 22, a fluid chamber 28 is formed. The fluid chamber 28 is communicatively connected to the outlet chamber 10 by a first passage 29 and a second passage 30 arranged in parallel.

In this embodiment, the first passage 29 is provided in the pressure receiving piston 19. In the first passage 29, a poppet type check valve 34 is provided, and a valve chamber 35 of the check valve 34 is formed so as to extend in the left-right direction. A valve seat 36 is provided on a left end wall of the valve chamber 35, and a ball 38 is biased by a spring 37 onto the valve seat 36. A central portion of the valve seat 36 is communicatively connected to an inlet passage 39, and the inlet passage 39 is communicatively connected to the fluid chamber 28. Meanwhile, the valve chamber 35 is communicatively connected to the outlet chamber 10 via an outlet passage 40. The first passage 29 is constituted by the inlet passage 39, the valve chamber 35, and the outlet passage 40.

The second passage 30 is formed by a fitting gap between the larger diameter hole 21 and the larger diameter portion 23, and the entirety of the fitting gap structures a throttle portion 31. That is, in this embodiment, the entirety of the second passage 30 from its end on the right end wall 1a side (one end side) to its end on the left end wall 1b side (the other end side) functions as the throttle portion 31. An operating rod 32 is provided so as to protrude rightward from the larger diameter portion 23. The operating rod 32 penetrates the opening 9a to come into contact with pressure reducing member 14.

The throttle portion 31 may be formed at a part of the fitting gap, instead of being structured by the entirety of the fitting gap. In other words, instead of the configuration in which the entirety of the second passage 30 from its end on the right end wall 1a side to its end on the left end wall 1b side functions as the throttle portion 31, a part of the second passage 30 may be formed to be narrower than the remaining part, to function as the throttle portion.

Between the left end wall 1b of the valve case 1 and the pressure receiving piston 19, a pressure setting spring 44 biasing the pressure receiving piston 19 rightward is attached with spring seats 45a and 45b. The pressure setting spring 44 includes a larger diameter spring 44a and a smaller diameter spring 44b.

Figure 2A:
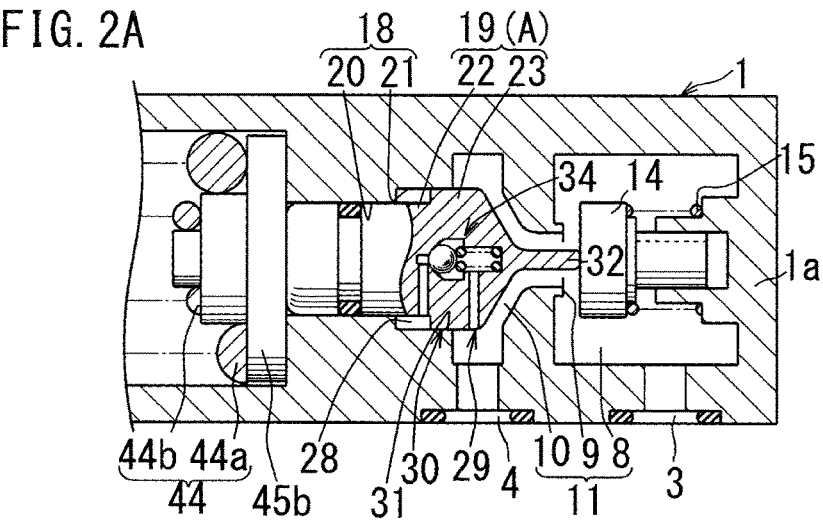
FIG. 2A to FIG. 2C are diagrams for illustrating the operation of the pressure reducing valve, and each of them is a partial view similar to FIG. 1.
Figure 2B:
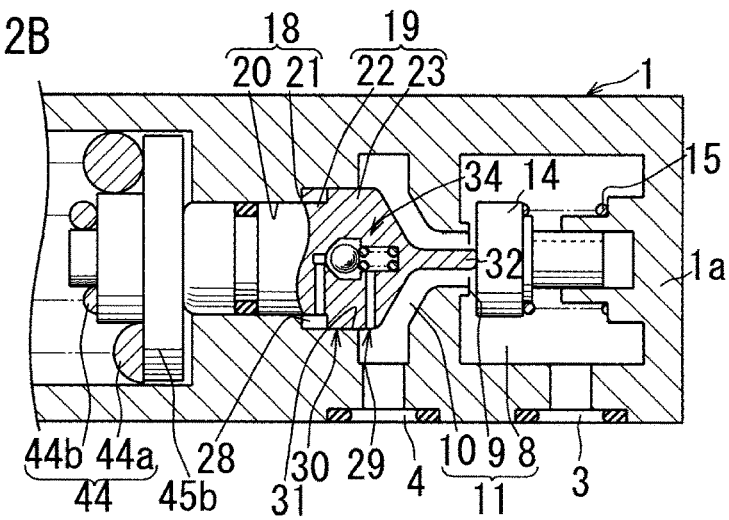
Figure 2C:
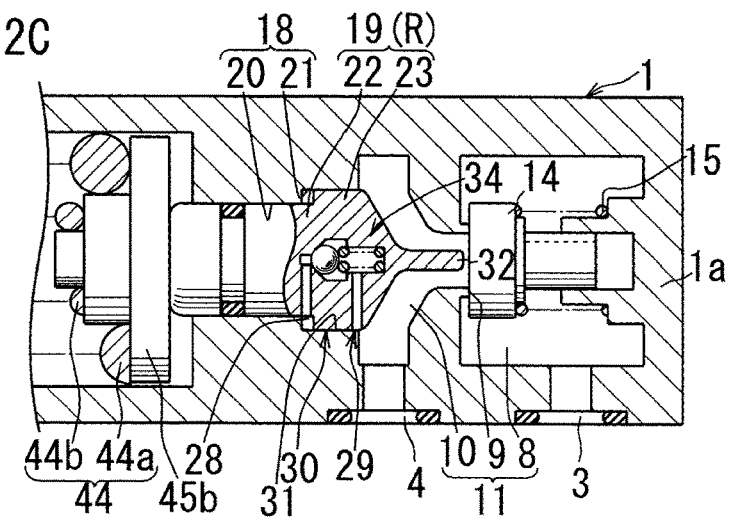

The above-described pressure reducing valve operates as follows, as shown in FIG. 2A to FIG. 2C.

In the initial state of FIG. 2A, the channel 11 and the fluid chamber 28 are filled with oil, while hydraulic force is not applied to the inlet hole 3. Because of this, the pressure setting spring 44 advances the pressure receiving piston 19 to an advanced position A, and the pressure receiving piston 19 causes the pressure reducing member 14 to separate from the pressure reducing valve seat 9 via the operating rod 32, with the result that a large gap is formed between the pressure reducing member 14 and the pressure reducing valve seat 9. Further, the volume of the fluid chamber 28 is at its maximum.

When the pressurized oil is supplied to the inlet hole 3 in the above fully open state of FIG. 2A, the pressure in the outlet chamber 10 rises, and thereby, the pressure receiving piston 19 is retracted from the advanced position A in FIG. 2A to the position shown in FIG. 2B, while the pressure reducing member 14 is moved leftward, biased by the valve-closing spring 15. Further, as the volume of the fluid chamber 28 is decreased with the leftward retraction of the pressure receiving piston 19, the pressure in the fluid chamber 28 rises to open the check valve 34, and the pressurized oil in the fluid chamber 28 flows out to the outlet chamber 10 through the first passage 29.

When the pressurized oil in the inlet chamber 8 further flows out to the outlet chamber 10 in the mid-course state of FIG. 2B, the pressure in the outlet chamber 10 rises to a setting value, and thereby, the pressure receiving piston 19 is retracted to a retracted position R shown in FIG. 2C, while the pressure reducing member 14 is moved leftward to come into contact with the pressure reducing valve seat 9.

When, in the closed state of FIG. 2C, the hydraulic cylinder connected to the outlet hole 4 consumes the pressurized oil to reduce the hydraulic force in the outlet chamber 10, the pressure receiving piston 19 is advanced rightward to bring the pressure reducing member 14 to the open state, as shown in FIG. 2B. By repeating the switching between the open state of FIG. 2B and the closed state of FIG. 2C, the pressure in the outlet hole 4 is held at a setting value.

As described above, when the pressure receiving piston 19 is advanced rightward, the volume of the fluid chamber 28 increases with this movement. Because of this, the pressure in the fluid chamber 28 drops, and therefore the pressurized oil in the outlet chamber 10 slowly flows into the fluid chamber 28 through the throttle portion 31 in the second passage 30. To be more specific, as the speed at which the volume of the fluid chamber 28 increases exceeds the speed at which the pressurized oil flows into the fluid chamber 28, the pressure in the fluid chamber 28 becomes lower than the pressure in the outlet chamber 10, and a force due to the pressure differential between the pressure in the outlet chamber 10 and the pressure in the fluid chamber 28 is applied to the pressure receiving piston 19 leftward. Thus, the force due to the pressure differential acting leftward functions as the resistance against the pressure setting spring 44 which biases the pressure receiving piston 19 to advance rightward, and this reduces the speed at which the pressure receiving piston 19 is advanced rightward.

Further, as described above, when the pressure receiving piston 19 is retracted leftward, the volume of the fluid chamber 28 decreases with this movement, and the pressure in the fluid chamber 28 becomes higher than the pressure in the outlet chamber 10. The high pressure in the fluid chamber 28 opens the check valve 34 with resistance to the spring 37, and then the pressurized oil in the fluid chamber 28 flows out rapidly to the outlet chamber 10 through the valve chamber 35. With this, the pressure receiving piston 19 is rapidly retracted leftward, and the pressure reducing member 14 is rapidly brought into the closed state.

The pressure reducing valve of the above-described embodiment brings about the following advantages.

In known pressure reducing valves, there is the following disadvantage. When the hydraulic cylinder consumes the pressurized oil to rapidly reduce the pressure in the outlet hole under the condition that the pressure in the outlet hole (and the pressure in the outlet chamber) has been adjusted to a setting value, the pressure receiving piston is rapidly advanced rightward, being biased by the pressure setting spring, to bring the pressure reducing member into the widely open state, with the result that the pressurized oil in the inlet chamber rushes into the outlet chamber, to increase the pressure in the outlet chamber. The thus increased pressure in the outlet chamber rapidly retracts the pressure receiving piston leftward with resistance to the pressure setting spring, and this rapidly brings the pressure reducing member into the closed state. Then, the pressure in the outlet chamber rapidly drops, and therefore the pressure setting spring rapidly brings the pressure reducing member into the open state via the pressure receiving piston. As such, chattering occurs in the known pressure reducing valve because the pressure reducing member is rapidly brought into the open state and to the closed state repeatedly.

Meanwhile, in the pressure reducing valve of the present invention, when the pressure in the outlet hole 4 rapidly drops, the aforementioned resistance enables the pressure receiving piston 19 to advance rightward slowly, thereby to slowly bring the pressure reducing member 14 into the open state. For this reason, the pressure in the outlet chamber 10 slowly rises. This suppresses chattering of the pressure receiving piston 19 and the pressure reducing member 14.

Further, in known pressure reducing valves, when the pressure in the outlet chamber rapidly drops to allow the pressure setting spring to rapidly move the pressure reducing member into the open state via the pressure receiving piston, the pressurized oil in the inlet chamber rushes into the outlet chamber, and this may cause an overshoot of the pressure in the outlet chamber, to cause hunting.

Meanwhile, in the pressure reducing valve of the present invention, the aforementioned resistance acts on the pressure receiving piston 19, and therefore the pressure receiving piston 19 is advanced rightward slowly. This enables the slow rise of the pressure in the outlet chamber 10. That is, the above structure reliably prevents occurrence of hunting due to the overshoot of the pressure in the outlet chamber 10.

The smaller diameter portion 22 and the larger diameter portion 23 of the pressure receiving piston 19 may be formed as separate members, instead of being formed into a single member. For example, the larger diameter portion 23 may be a member shaped into a piston ring, and the thus formed larger diameter portion 23 may be attached to the smaller diameter portion 22.

Figure 3:
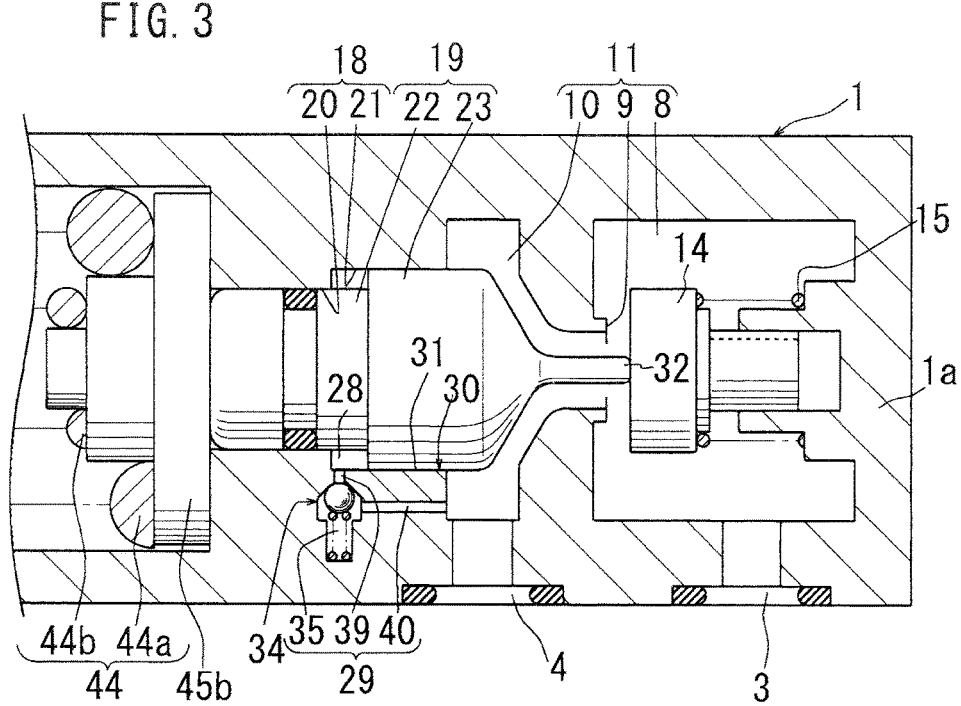
FIG. 3 shows Second Embodiment of the present invention, and is a diagram similar to FIG. 2A.
Figure 4:
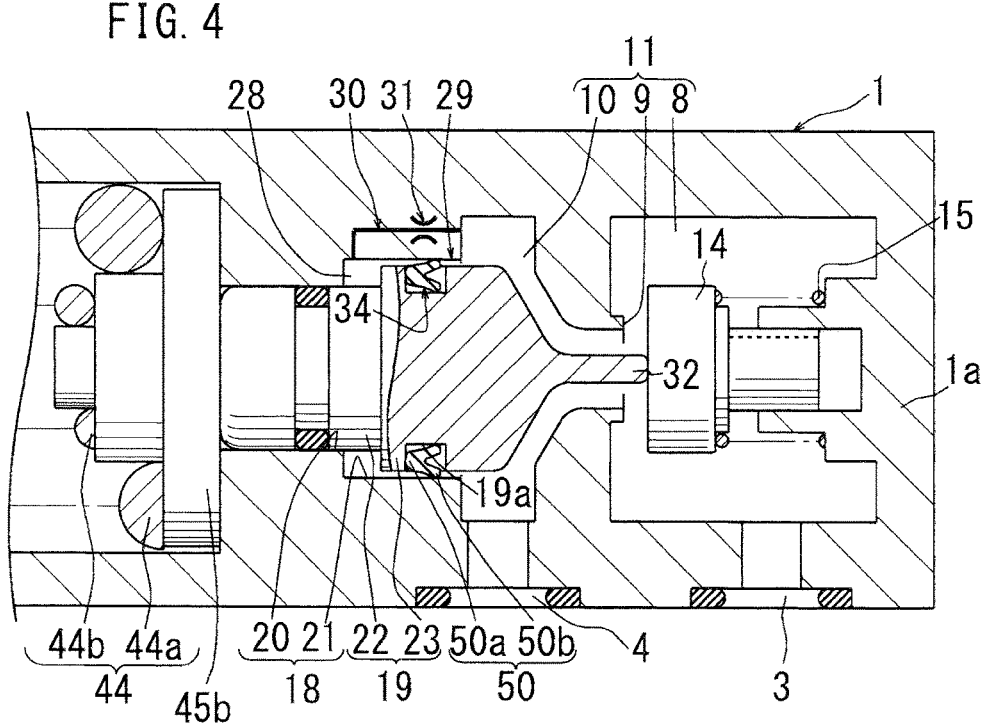
FIG. 4 shows Third Embodiment of the present invention, and is a diagram similar to FIG. 2A.

FIG. 3 and FIG. 4 respectively show Second Embodiment and Third Embodiment of the present invention. In each of these embodiments, the components identical (or similar) to those in First Embodiment are given the same reference signs as in First Embodiment.

Second Embodiment shown in FIG. 3 is different from the above-described First Embodiment in the following points.

The first passage 29 is provided in a lower portion of the valve case 1. In the first passage 29, the check valve 34 is provided.

Third Embodiment shown in FIG. 4 is different from the above-described First Embodiment in the following points.

The first passage 29 is provided between the larger diameter hole 21 of the piston hole 18 and the larger diameter portion 23 of the pressure receiving piston 19. In the first passage 29, there is provided the check valve 34 with a U packing (elastic sealing member) 50 made of rubber. The U packing 50 is attached into a groove 19a of the pressure receiving piston 19 so that a base end portion 50a of the U packing 50 is located closer to the fluid chamber 28. An outer peripheral portion of a leading end portion 50b of the U packing 50 is in contact with a peripheral wall of the larger diameter hole 21, thereby to close a gap between the larger diameter hole 21 and the larger diameter portion 23. Meanwhile, the second passage 30 is provided in the valve case 1. In the second passage 30, the throttle portion 31 is provided.

In this arrangement, when the volume of the fluid chamber 28 decreases with the leftward retraction of the pressure receiving piston 19, the pressure in the fluid chamber 28 rises to open the check valve 34, and then the pressurized oil in the fluid chamber 28 flows out to the outlet chamber 10 through the gap between the leading end portion 50b and the peripheral wall of the larger diameter hole 21.

Meanwhile, when the volume of the fluid chamber 28 increases with the rightward advance of the pressure receiving piston 19, the pressure in the fluid chamber 28 drops to close the check valve 34, and then the pressurized oil in the outlet chamber 10 slowly flows into the fluid chamber 28 through the throttle portion 31 in the second passage 30.

It should be noted that the above-mentioned elastic sealing member may be a member of a different shape such as an O ring, instead of the rubber-made U packing 50, which is described as an example. Alternatively, the elastic sealing member may be made of different material, such as resin.

Each of the above-described embodiments may be changed as follows.

Instead of the pressurized oil described as an example, the pressurized fluid may be other liquid, or gas such as pressurized air.

The check valve 34 is not limited to the poppet type check valve or the packing type check valve described as an example.

Moreover, it is a matter of course that other changes or alterations can be made on the present invention within the scope of envisagement of one skilled in the art.

REFERENCE SIGNS LIST

1: valve case, 8: inlet chamber, 9: pressure reducing valve seat, 10: outlet chamber, 14: pressure reducing member, 15: valve-closing spring, 18: piston hole, 19: pressure receiving piston, 20: smaller diameter hole, 21: larger diameter hole, 22: smaller diameter portion, 23: larger diameter portion, 28: fluid chamber, 29: first passage, 30: second passage, 31: throttle portion, 34: check valve, 44: pressure setting spring, 50: U packing (elastic sealing member)

The invention claimed is:

1. A pressure reducing valve comprising:
an inlet chamber, a pressure reducing valve seat, and an outlet chamber which are formed in a valve case so as to be arranged in a tandem manner from one end side to another end side;
a pressure reducing member inserted into the inlet chamber so as to be advanceable and retractable, the pressure reducing member being biased by a valve-closing spring toward the pressure reducing valve seat on the another end side;
a piston hole formed in the outlet chamber;
a pressure receiving piston inserted into the piston hole so as to be advanceable and retractable, the pressure receiving piston being biased by a pressure setting spring toward the one end side so as to separate the pressure reducing member from the pressure reducing valve seat;
a fluid chamber defined by the piston hole and the pressure receiving piston, the volume of the fluid chamber increasing with advance of the pressure receiving piston toward the one end side and decreasing with retraction of the pressure receiving piston toward the another end side;
a first passage and a second passage provided in parallel, each of which is provided to communicatively connect the fluid chamber and the outlet chamber with each other;
a check valve provided in the first passage, the check valve being configured to prevent flow from the outlet chamber to the fluid chamber and to permit flow from the fluid chamber to the outlet chamber; and
a throttle portion provided in the second passage;
wherein the throttle portion is provided between the piston hole and the pressure receiving piston.

2. The pressure reducing valve according to claim 1, wherein
the check valve is provided in the pressure receiving piston.

3. A pressure reducing valve comprising:
an inlet chamber, a pressure reducing valve seat, and an outlet chamber which are formed in a valve case so as to be arranged in a tandem manner from one end side to another end side;
a pressure reducing member inserted into the inlet chamber so as to be advanceable and retractable, the pressure reducing member being biased by a valve-closing spring toward the pressure reducing valve seat on the another end side;
a piston hole formed in the outlet chamber;
a pressure receiving piston inserted into the piston hole so as to be advanceable and retractable, the pressure receiving piston being biased by a pressure setting spring toward the one end side so as to separate the pressure reducing member from the pressure reducing valve seat;
a fluid chamber defined by the piston hole and the pressure receiving piston, the volume of the fluid chamber increasing with advance of the pressure receiving piston toward the one end side and decreasing with retraction of the pressure receiving piston toward the another end side;
a first passage and a second passage provided in parallel, each of which is provided to communicatively connect the fluid chamber and the outlet chamber with each other;
a check valve provided in the first passage, the check valve being configured to prevent flow from the outlet chamber to the fluid chamber and to permit flow from the fluid chamber to the outlet chamber; and
a throttle portion provided in the second passage;
wherein:
the piston hole includes a first diameter hole and a second diameter hole, the second diameter hole being smaller than the first diameter which are formed in an end wall of the outlet chamber on the another end side so as to be arranged in order toward the another end side;
the pressure receiving piston includes a first diameter portion fitted in the first diameter hole and a second diameter portion hermetically inserted into the second diameter hole;

the fluid chamber is formed between the first diameter hole and the second diameter portion; and the throttle portion is provided between the first diameter hole and the first diameter portion.

4. The pressure reducing valve according to claim 3, wherein the check valve is provided in the pressure receiving piston.

5. A pressure reducing valve comprising:

an inlet chamber, a pressure reducing valve seat, and an outlet chamber which are formed in a valve case so as to be arranged in a tandem manner from one end side to another end side;

a pressure reducing member inserted into the inlet chamber so as to be advanceable and retractable, the pressure reducing member being biased by a valve-closing spring toward the pressure reducing valve seat on the another end side;

a piston hole formed in the outlet chamber;

a pressure receiving piston inserted into the piston hole so as to be advanceable and retractable, the pressure receiving piston being biased by a pressure setting spring toward the one end side so as to separate the pressure reducing member from the pressure reducing valve seat;

a fluid chamber defined by the piston hole and the pressure receiving piston, the volume of the fluid chamber increasing with advance of the pressure receiving piston toward the one end side and decreasing with retraction of the pressure receiving piston toward the another end side;

a first passage and a second passage provided in parallel, each of which is provided to communicatively connect the fluid chamber and the outlet chamber with each other;

a check valve provided in the first passage, the check valve being configured to prevent flow from the outlet chamber to the fluid chamber and to permit flow from the fluid chamber to the outlet chamber; and a throttle portion provided in the second passage;

wherein the check valve is provided in the pressure receiving piston.

6. A pressure reducing valve comprising:

an inlet chamber, a pressure reducing valve seat, and an outlet chamber which are formed in a valve case so as to be arranged in a tandem manner from one end side to another end side;

a pressure reducing member inserted into the inlet chamber so as to be advanceable and retractable, the pressure reducing member being biased by a valve-closing spring toward the pressure reducing valve seat on the another end side;

a piston hole formed in the outlet chamber;

a pressure receiving piston inserted into the piston hole so as to be advanceable and retractable, the pressure receiving piston being biased by a pressure setting spring toward the one end side so as to separate the pressure reducing member from the pressure reducing valve seat;

a fluid chamber defined by the piston hole and the pressure receiving piston, the volume of the fluid chamber increasing with advance of the pressure receiving piston toward the one end side and decreasing with retraction of the pressure receiving piston toward the another end side;

a first passage and a second passage provided in parallel, each of which is provided to communicatively connect the fluid chamber and the outlet chamber with each other;

a check valve provided in the first passage, the check valve being configured to prevent flow from the outlet chamber to the fluid chamber and to permit flow from the fluid chamber to the outlet chamber; and a throttle portion provided in the second passage;

wherein:

the first passage is formed between the piston hole and an outer peripheral surface of the pressure receiving piston;

the second passage is provided in the pressure receiving piston or in the valve case;

the check valve includes an elastic sealing member attached between the piston hole and the pressure receiving piston; and the elastic sealing member is configured to prevent the flow from the outlet chamber to the fluid chamber and to permit the flow from the fluid chamber to the outlet chamber.

* * * * *